March 1, 1932.  C. E. CARPENTER  1,847,293
DOUGHNUT MACHINE AND THE LIKE
Filed Jan. 12, 1931
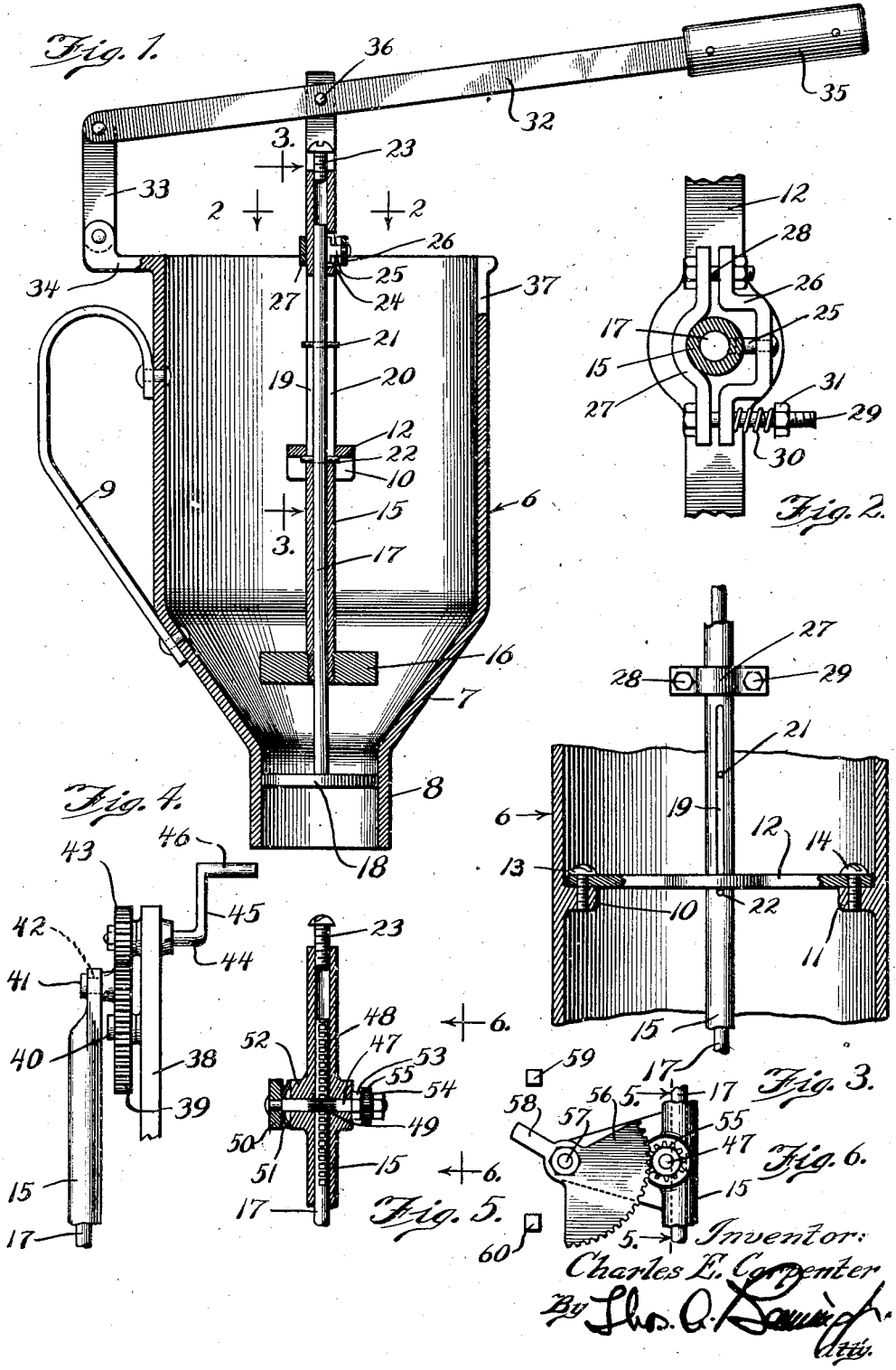

Patented Mar. 1, 1932

1,847,293

UNITED STATES PATENT OFFICE

CHARLES E. CARPENTER, OF CHICAGO, ILLINOIS

DOUGHNUT MACHINE AND THE LIKE

Application filed January 12, 1931. Serial No. 508,314.

This invention has to do with certain improvements in doughnut machines and the like, that is, improvements in machines for forming doughnuts and delivering them into the frying pan or cooking vessel. One of the features of the invention relates to a construction of machine which is very well adapted for use in small sizes. For example, the construction herein disclosed is of such a nature that it is particularly well adapted for use in individual homes or households where a relatively small quantity of batter is made up and used at one time; the machine being so constructed that it will, however, accurately form the doughnuts and deliver them into the frying pan.

Although the construction herein disclosed is especially intended for use in machines of small size, it will presently appear that it is not limited to such use and certain of the features of the invention are also well adapted for use in large or commercial size machines.

Another feature of the invention relates to a very simple but effective construction of mechanism for forming and delivering the doughnuts. This device is so constructed that the necessary relative movements of the plunger and valve mechanisms with respect to the delivery throat are performed and timed with a minimum number of moving parts consistent with the necessary operations. At the same time the device is so constructed and arranged that the operations may be adjusted for delivering doughnuts of different sizes within the range of adjustments for which the particular device is designed. This adjustment of size is also performed in a very simple manner and by the adjustment of a single set-screw or the like.

Another feature of the invention relates to the provision of a construction which is so arranged that it can be very easily supported or carried by one hand of the operator, leaving the other hand free to perform the necessary operations or manipulations of the actuating handle or crank.

Another object of the invention is to provide a construction such that the operating parts can be readily removed from the hopper or container in order to permit the parts and the interior of the container to be cleaned, or for the purpose of substituting other parts.

Another object of the invention is to provide a construction in which the plunger and valve devices travel together at the same speed during a portion of their movements, and in which the final upward and downward movements of the plunger element are accompanied with reverse movements of the valve element so as to ensure a better movement of the dough into and out of the throat.

Other objects and uses of the invention will appear from a detailed description of the same, which consists in the features of construction and combinations of parts hereinafter described and claimed.

In the drawings

Figure 1 shows a vertical central section through a machine embodying the features of the present invention, the handle and principal operating parts being in the raised position;

Figure 2 shows a fragmentary cross section on the line 2—2 of Figure 1, looking in the direction of the arrows;

Figure 3 shows a fragmentary vertical section on the line 3—3 of Figure 1, looking in the direction of the arrows;

Figure 4 shows a fragmentary view of the upper portion of the device and operating parts showing a modified construction of driving mechanism;

Figure 5 shows a fragmentary view of a modified form of friction connection between the sleeve and central valve operating rod; and Figure 6 shows a fragmentary side elevation as shown at 6—6 in Figure 5 looking in the direction of the arrows.

Referring to the drawings, there is provided a hopper of cup shape form designated by the numeral 6. The same has its lower portion 7 contracted or drawn together and terminating in a downwardly extending throat 8. The cup-shaped hopper 6 is provided on one side with a handle 9 of convenient form by which the device can be easily held in one hand.

In its central portion, the hopper 6 is provided with a pair of oppositely disposed lugs 10 and 11, which reach inwardly a slight distance and serve as a support to which a cross bracket 12 may be secured, as by means of the screws 13 and 14. This cross bracket has its central portion slightly enlarged and provided with a central hole which accommodates a vertically slidable tubular sleeve member 15. The lower end of this sleeve member carries the plunger 16, which is of proper size to work nicely within the throat 8.

A valve rod 17 extends up through the sleeve 15 within which said rod rides easily, and the lower end of said rod 17 carries a valve 18, of proper size to work nicely within the throat 8.

The sleeve 15 is longitudinally slotted on its opposite sides as shown at 19 and 20, and the rod 17 is provided with upper and lower cross pins 21 and 22, which work in said slots 19 and 20 and thereby serve to limit any relative longitudinal movement between the sleeve and rod under certain conditions.

The pin 21 is placed above the position of the bracket 12 and the pin 22 below said bracket as best shown in Figures 1 and 3.

The upper end of the sleeve 15 is closed and an adjustment screw 23 is threaded down through said closed end so that the lower end of said screw may serve as an abutment which will contact against the upper end of the rod 17 to limit relative movement between the parts under certain conditions.

There is a friction shoe 24 which extends through an opening of the sleeve 15 and into contact with the rod 17. Said friction shoe has a lug or button 25 which reaches to the outside of the sleeve 15 and may be contacted by a bracket piece 26, which cooperates with a companion bracket piece 27 at the other side of the sleeve 15. A pin or bolt 28 joins together the bracket pieces 26 and 27 at one side, and a pin or bolt 29 joins them together at the other side under compression of a spring 30. The result is that by tightening up the nut 31 on the bolt 29, the spring 30 can be placed under any desired amount of compression which will be communicated to the shoe 24 through the medium of the lug 25, thus establishing a desired and adjusted amount of friction between the sleeve 15 and the rod 17.

There is an operating lever 32 which has one end connected by a link 33 to a lug 34 projecting out from that side of the upper portion of the container 6 above the position of the handle 9. The operating lever 32 is provided at its other end with a hand piece or handle 35 by means of which it may be conveniently moved up and down. The central portion of this lever 32 is pinned to the upper bifurcated portion of the sleeve 15 by means of a pin 36. Consequently, by moving the handle 35 up and down, the sleeve 15 will also be moved up and down.

The operation of the device is as follows:

When the handle 35 is raised to its upper limit of movement, the sleeve 15 is raised and the lower ends of the slots 19 and 20 will engage the cross pin 22 so as to raise the rod 17 until the cross pin 22 strikes the bracket 12 which will limit the upward movement of all of the parts. At this position, the valve 18 stands in the upper portion of the throat 8 and the plunger 16 has been raised high enough to drawn in a proper charge of dough against its lower surface and between the plunger 16 and the valve 18. It will be noted that in this position which is shown in Figure 1, the engagement of the valve 18 with the throat 8 establishes a lower journal or guide for the reciprocation of the parts, and the cross bracket 12 establishes another journal or guide for these parts so that they are compelled to reciprocate in a vertical straight line movement. It will also be noted that in this position, the pin 21 occupies a position substantially below the upper ends of the slots 19 and 20.

Upon forcing the handle 35 downwardly, the friction established by the shoe 24 will be sufficient to cause the sleeve 15 and rod 17 to travel down together so that the plunger 16 and valve 18 will also travel downwards, together, and at the spacing or separation between them which is shown in Figure 1. The plunger 16 will enter the upper end of the throat 8 before the valve 18 passes out of the lower end of said throat, so that a quantity of dough will be trapped in the throat between the plunger and the valve.

The above harmonious downward movement of the parts will continue until the pin 21 strikes the upper end of the bracket 12, so as to arrest the movement of the rod 17 and valve 18. This action will not take place until the valve 18 has passed out of the lower end of the throat to a position such as to permit the charge of dough to be properly discharged by further movement of the plunger 16. Consequently, when the pin 21 has been arrested by the bracket 12 with the valve 18 below the lower end of the throat 8, further downward movement of the handle 35 will force the sleeve 15 to move on down notwithstanding the friction established by the shoe 24, and such further movement will continue until the upper ends of the slots 19 and 20 strike the pin 21 or until the adjustment screw 23 strikes the upper end of the rod 17, and the latter condition is the one which will generally control the operation. During this portion of the operation, the plunger 16 is being forced down while the valve 18 is stationary at a position below the lower end of the throat, and this downward movement of the plunger will drive the dough out of the lower end of the throat and around the valve 18, at the same time bringing the plunger and valve closer together by an amount equal to this subsequent movement.

When the downward movement of the parts has been finally arrested, the handle 35 may be raised, thereby raising the sleeve 15. Due to the friction established by the shoe 24, the rod 17 and valve 18 will be raised simultaneously with the sleeve, thereby raising the plunger 16 and valve 18 while they occupy their position relatively close together. At the same time, this upward movement of the valve 18 will serve to cut off the batch of dough by cooperation of the valve 18 with the lower end of the throat 8, so that the dough batch will be perforated and delivered in the form of a ring of dough.

As the upward movement of handle 35 continues, the pin 22 will come to rest against the lower face of the bracket 12, so that further upward movement of the rod 17 and valve 18 will be arrested, and this will take place when the valve 18 is in the upper portion of the throat and before it pulls up entirely out of the throat. At this arresting of upward movement of the rod and valve, upward movement of the handle will draw the sleeve 15 and plunger 16 upwardly, notwithstanding the friction established by the shoe 24, and this movement will continue until the lower ends of the slots 19 and 20 come to bearing against the pin 22, whereupon further upward movement will be arrested.

The upward movement of the plunger 16 after the valve 18 has been arrested, will result in drawing in of a fresh batch of dough between the plunger and the valve due to a suction created between these parts, and in preparation for the next dough batch feeding operation.

It will be noted that the plunger 16 and valve 18 are always raised to the same upper limit of movement as dictated by the engagement of the pin 22 with the bracket bar 12 on the upward stroke. Consequently, the space beneath the plunger 16 for accommodation of fresh dough is always the same; however, on the down stroke, the valve 18 always moves to the same lower limit of movement, but the plunger 16 does not always move to the same lower limit of movement. This is because the downward movement of the sleeve 15 and plunger 16 is arrested by engagement of the adjustment screw 23 with the upper end of the rod 17. This downward movement of the plunger 16 is the operation which delivers the dough-batch and therefore the quantity of dough which will be delivered is regulated and determined by the position of the adjustment screw 23. It is thus possible to adjust the operation of the machine to deliver doughnuts with different quantities of material in them, such regulation being effected in an extremely simple manner by merely adjusting the screw 23.

In some cases, it may be desirable to slot the upper front edge of the container 6 as shown at 37, to accommodate the downward movement of the lever 32 for extreme movements.

In Figure 4, I have shown a fragmentary view of the upper portion of the sleeve 15 and connected parts, including a gearing arrangement for raising and lowering said sleeve instead of the lever arrangement of Figure 1. In the present case, a bracket 38 is carried by a suitable connection with the can or container 6. A gear wheel 39 is journaled on the bracket 38 at the point 40, said gear wheel carrying a pin 41 which engages a transverse slot 42 in the upper portion of the sleeve 15, so that as the gear 39 rotates, the sleeve 15 is moved up and down, the slot 42 being of proper size to accommodate the pin 41 during such movements. The gear 39 may be driven by a pinion 43 which is carried by a crank-shaft 44 journaled to the bracket 39, said crank-shaft having a crank 45 provided with a handle 46.

The modified arrangement of Figure 4 will in some cases provide a more convenient method of driving the reciprocating parts.

In Figure 5, I have shown a modified construction of device for establishing a frictional connection between the sleeve 15 and the pin or rod 17, to take the place of the friction shoe 24 and adjacent parts of the previous construction. In the present case, a shaft 47 extends transversely through the sleeve 15. The rod 17 is provided with ratchet teeth 48 and the shaft 47 is provided with a small pinion 49 meshing with said teeth 48. Consequently, any relative longitudinal movement between the sleeve 15 and rod 17 must be accompanied by a rotation of the shaft 47.

Said shaft 47 carries a small disk 50 on its outer end, and a washer shaped spring 51 is set between the disk 50 and a stud or projection 52 on the adjacent face of the sleeve 15. A nut 53 on the shaft 47 serves to draw said shaft over so as to place the spring washer 51 under the desired amount of compression to create the friction which is desired; and preferably a lock nut 54 is also placed on the shaft 47 outside of the nut 53, so that the parts will not become improperly changed in their adjustment.

In some cases a small pinion 55 may be secured to the shaft 47 between the nuts 53 and 54 so that said pinion is rigidly secured to the said shaft. A ratchet 56 of larger size than the pinion 55 may be pivoted to the sleeve at the point 57, said ratchet being provided with a short arm extension 58. There are also provided stationary stops 59 and 60 near the upper and lower limits of movement of the arm 58 as the sleeve is moved up and down, so that just before the upper and lower limits of movement of said sleeve the arm 58 will engage the stop 59 or 60 as the case may be, and the final movement of the sleeve will cause the said arm to swing and thereby rotate the small pinion 49 with corresponding shift of the rod 17 down or up with respect to the sleeve 15 as the case may be. The arrangement is such that before reaching the upper limit of movement of the sleeve the rod is actually forced to move down to thereby move the valve 18 down, thus assisting the drawing of the fresh dough batch into the upper end of the throat. A reverse movement will occur at the lower limit of movement of the parts.

With this construction it will be evident that the sleeve 15 and rod 17, together with the connected plunger and valve elements with be compelled to travel together as long as the force between them does not exceed the frictional resistance set up by the spring washer 51 during the central portion of their movements, and that the reversal of movement of the valve element is produced in a very simple and effective manner.

I claim:

1. In a device of the class described, the combination of a dough hopper having its lower portion tapered in size and terminating in a downwardly extending throat, a handle secured to said hopper for manual support of the same, a bracket extending across and removably secured into the central portion of the hopper, a sleeve extending vertically through the central portion of the hopper and slidably mounted in said bracket, a plunger on the lower end of said sleeve, a rod extending through and slidably mounted within the sleeve, a valve on the lower end of said rod, both said plunger and valve fitting into and reciprocating within the throat aforesaid, an operating lever having one end pivotally connected to the upper portion of the hopper adjacent to said supporting handle and having its other end provided with a suitable hand grip, a pivotal connection between the central portion of said lever and the upper end of the sleeve, the sleeve being vertically slotted, cross pins on the rod extending into the slot of the sleeve and located above and below the bracket aforesaid, together with friction means connecting the rod and sleeve together, the slot of the sleeve being of greater dimension than the distance between the pins aforesaid, whereby reciprocation of the sleeve and plunger in either direction is accompanied by simultaneous movement of the rod and valve until movement of the rod and valve is arrested by engagement of a pin with the bracket, and whereby further movement of the sleeve and plunger is permitted upon application of a force sufficient to overcome the frictional resistance, substantially as described.

2. In a device of the class described, the combination of a hopper having a downwardly extending cylindrical throat, a bracket extending across the central portion of said hopper, a vertical sleeve extending through the central portion of the hopper and slidably mounted in said bracket, a plunger on the lower end of said sleeve, a valve rod extending longitudinally through and slidably mounted in said sleeve, a valve on the lower end of said rod, both said plunger and valve being of proper size to work through said cylindrical throat, means for reciprocating the sleeve vertically, suitable friction means between the rod and sleeve normally causing the rod and valve to travel with the sleeve and plunger, and means for arresting the movement of the rod and valve in either direction while permitting continued movement of the sleeve and plunger for a further distance upon application of a force sufficient to overcome the frictional engagement of the parts, substantially as described.

3. In a device of the class described, the combination of a hopper having a downwardly extending cylindrical throat, a bracket extending across the central portion of said hopper, a vertical sleeve extending through the central portion of the hopper and slidably mounted in said bracket, a plunger on the lower end of said sleeve, a valve rod extending longitudinally through and slidably mounted in said sleeve, a valve on the lower end of said rod, both said plunger and valve being of proper size to work through said cylindrical throat, means for reciprocating the sleeve vertically, suitable friction means between the rod and sleeve normally causing the rod and valve to travel with the sleeve and plunger, means for arresting the movement of the rod and valve in either direction while permitting the sleeve and plunger to move a further distance in said direction, and for thereafter arresting movement of the sleeve and plunger in such direction, substantially as described.

4. In a device of the class described, the combination of a hopper, a downwardly extending cylindrical throat in connection with the lower portion thereof, a plunger and a valve of proper size for movement through said throat, and means for reciprocating said plunger and valve in timed relationship comprising a sleeve connected to the plunger, a rod connected to the valve and working into the sleeve, a friction connection between the rod and sleeve compelling said parts to normally reciprocate as a unit to thereby also normally move the plunger and valve together, means for arresting movement of the rod and valve in either direction corresponding to positions of upper and lower limits of valve movement and with the valve within the upper portion of the cylindrical throat and beneath the lower portion of said throat respectively, and means for moving the sleeve and plunger independently of the rod and valve for further movements, substantially as described.

5. In a device of the class described, the combination of a throat for the formation and delivery of doughnuts and the like, of a plunger and a valve working in said throat, means for connecting said parts together to cause them to travel in unison in the same direction through a definite distance of travel wherein the speed of travel of said parts is the same, and means for reversing the direction of travel of the valve as compared to the travel of the plunger during the end portion of the plunger travel in each direction, substantially as described.

6. In a device of the class described, the combination of a throat for the formation and delivery of doughnuts or the like, of a plunger and a valve working in said throat, means for causing said parts to travel at the same speed during a definite portion of their travel in either direction, and means for reversing the travel of the valve as compared with the travel of the plunger during the end portion of the travel of the plunger in either direction, substantially as described.

7. In a device of the class described, the combination of a throat for the formation and delivery of doughnuts and the like, of a plunger and a valve working in said throat, means for causing said parts to travel at the same speed during a definite portion of their travel in either direction, and means for reversing the travel of the valve as compared with the travel of the plunger during the end portion of the travel of the plunger in the upward direction, substantially as described.

CHARLES E. CARPENTER.